Aug. 27, 1968  P. J. MULLAN ET AL  3,398,870

CONTROLLED AIR FILM BEARING

Filed Jan. 23, 1967  2 Sheets-Sheet 1

INVENTORS
PHILIP J. MULLAN
SANDFORD PLATTER

BY  *Howell H. Sweeney Jr.*
ATTORNEY

United States Patent Office 3,398,870
Patented Aug. 27, 1968

3,398,870
CONTROLLED AIR FILM BEARING
Philip J. Mullan, Poughkeepsie, N.Y., and Sandford Platter, Boulder, Colo., assignors to International Business Machines Corporation, Armonk, N.Y., a corporation of New York
Filed Jan. 23, 1967, Ser. No. 611,149
10 Claims. (Cl. 226—97)

ABSTRACT OF THE DISCLOSURE

The apparatus contains grooves extending across the entire width of a surface of a body member near the edge thereof first encountered by a flexible material such as a tape which passes thereover. The grooves are symmetrical with respect to a center line of the surface extending in the direction of material travel and also extend angularly from the centerline across the surface in the direction of travel of the material over the surface. The grooves themselves are of a predetermined number and have a predetermined depth, width and spacing with respect to the tape passing thereover to produce an air pumping action which provides a particular spacing of the tape with respect to the surface following the grooves.

---

This invention relates to apparatus for providing controlled air film lubrication between moving flexible material and a flat surface. More particularly, this invention relates to means for controlling the precise thickness of an air lubricating film to an order of millionths of an inch.

Prior web bearings, such as described and claimed in U.S. patent application Ser. No. 463,727 filed June 14, 1965, now Patent No. 3,327,916 required a controlled vacuum operable through slots located near the leading edge of a flat surface just before the selected area over which the spacing of the flexible web material from the surface is to be precisely controlled. The vacuum created through the slots removes air from the underside of the flexible material such that a pressure differential exists across the material which pressure differential causes the material to draw closer to the surface over which the spacing of the flexible material is to be precisely controlled. Once the pressure differential has been counteracted, the tape will continue along a continuous surface at the particular tape-surface displacement.

One of the disadvantages of the vacuum controlled air film of the above mentioned patent application is the possibility of wear of the tape at start-up if the vacuum is already applied thereto. In other words, the vacuum will tend to hold the tape against the slots and the area adjacent to the slots. Alternatively, it is necessary to drive the tape at a particular velocity before applying the vaccum through the slots in order to prevent wear. Of course, it is possible that the early information on the tape may be lost, both in a reading and writing operation since the tape is outside of the reading and writing range of the head when the vacuum is not applied to provide the controlled spacing of the tape above the selected area.

The subject invention not only overcomes the need for a separate vacuum source and vacuum control, but also eliminates the above described disadvantage. Furthermore, the subject invention obtains control of the air film thickness automatically as the flexible material moves.

Although air is the bearing medium of primary usage with this invention, it is recognized that this invention can use many gases instead of air.

Accordingly, it is an object of this invention to provide a gas bearing providing a lubricating gas film with a uniform thickness over any required length of flexible material being supported by the bearing.

It is another object of this invention to provide a gas bearing in which the spacing of the flexible material over the selected area is automatically adjusted whenever the flexible material has motion relative to the selected area.

It is a further object of the present invention to provide a gas bearing in which the possibility of tape wear due to contacting the opposite bearing surface is completely eliminated.

It is another object of the present invention to provide a gas bearing in which the spacing of the flexible material with respect to the selected area is obtained without the use of any vacuum apparatus.

It is a further object of the present invention to provide an air bearing in which the lubricating air film thickness is controlled to an order of millionths of an inch.

It is yet a further object of the present invention to provide an air bearing which provides ideal operation between magnetic tape and a magnetic head.

It is another object of the present invention to provide an air bearing in which the lubricating air film thickness can be adjusted by changing the velocity of the flexible material in relation to the opposing solid surface.

It is yet a further object of the present invention to provide an air bearing between a web and an opposing solid surface than can contain one or a plurality of magnetic head gaps flush with the surface of the solid and at any location within an area that can be made as large as required.

It is yet another object of the present invention to provide an air bearing which can operate with a web moving in a forward or reverse direction.

The above objects are obtained by controlling the spacing between the surface of a body and a material having relative movement along the surface. The selected area of the surface over which the spacing of the material is controlled is preceded in the direction of approach of the material by a plurality of grooves in the surface. The grooves are symmetrical about a centerline of the surface extending in the direction of material travel. The grooves also extend angularly in the direction of travel of the material over the surface from the centerline across the surface and thru the respective sidewalls of the body member to provide a substantially unobstructed path. Drive means provide movement of said material over said grooves centered on and parallel to the centerline of the surface of the body member to thereby obtain the desired spacing between the material and the surface of the body member.

The foregoing and other objects, features and advantages of the invention will be apparent from the following more particular description of the preferred embodiments of the invention as illustrated in the accompanying drawings.

Figure 8A:
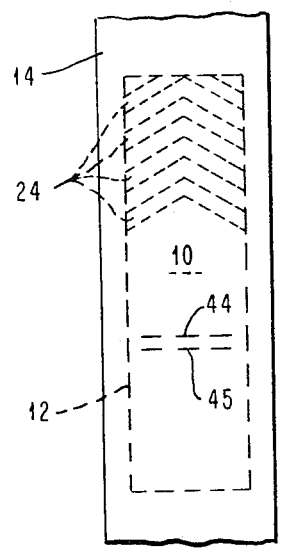

FIGS. 8A, B and C illustrate top views of different embodiments of the invention.

Figure 9:
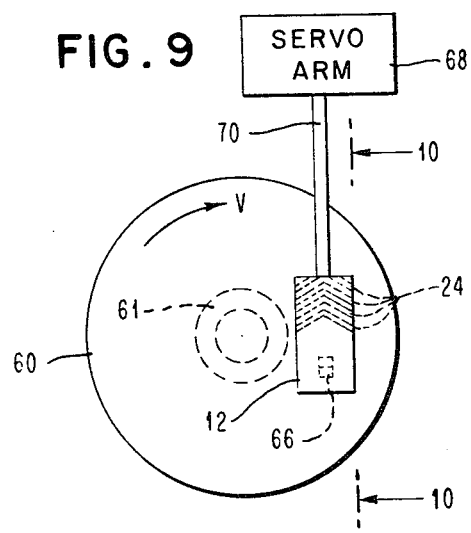
Figure 10:
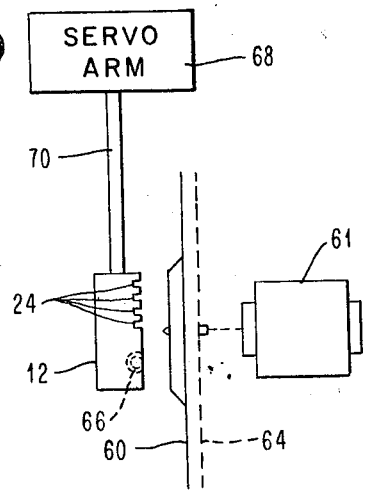

FIGS. 9 and 10 illustrate an adaptation of the invention to a flexible rotating disk environment.

Figure 1:
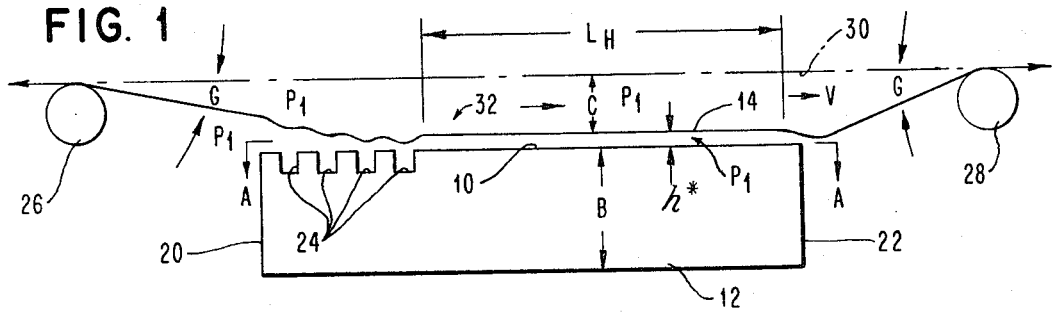
FIG. 1 is a side view of the body member and tape showing the tape in controlled relationship to said body member.

Referring to FIG. 1, there is shown an embodiment of this invention which includes a flat surface 10 on a body member 12, a tape 14, between supports 16 and 18 driven at a predetermined velocity (in the direction of the arrow) over the surface 10. The body 12, has a leading edge 20 which faces the oncoming tape 14. The tape 14 leaves the body member 12 at a lagging end face 22 which is at the opposite end of the body member 12 from the leading face 20.

A plurality of grooves 24 are formed in the surface 10 of the body member 12 and pass therethrough from side to side. It will be appreciated that the grooves extend all the way across the surface of the body member. FIG. 3, which is a plan view taken along the line AA of FIG. 1, shows that the grooves not only extend all the way across the surface of the body but have a particular angular relationship $\theta$ with respect thereto. The grooves 24 closest to the leading edge 20, because of this angular relationship, may pass thru the leading edge 20 of the body member 12 as can best be seen in FIGS. 3–6. In FIGS. 1 thru 4, four grooves 24 are shown. However, the grooves 24 need not be limited to this number but are determined in accordance with the spacing $h^*$ desired between the selected surface of the body member and the tape. Of course, the number of grooves 24 is further dependent on various other factors which affect the pumping action such as the groove depth, the angular relationship $\theta$ with the body member, the groove width, the width of the surface area between the grooves and the velocity V of relative movement of the tape and body member.

The supports 26 and 28 for the tape 14 may be of any known type such as roller idlers, blowing air lubricated fixed supports, hydrodynamically lubricated supports, etc. The tape 14 is drawn between the supports 26 and 28 with a predetermined tension. As can be seen from FIG. 1, when the tape is not moving the tension is sufficient to cause it to assume a straight line position 30 between the supports 26 and 28.

When the tape 14 is moved between the supports 26 and 28 at a predetermined velocity, the moving tape 14 acquires the position represented by a second tape path 32 between the supports 26 and 28. The movement of the tape 14 downwardly from its initial stationary position 30 to its moving position 32 involves a displacement C which may be only a few thousandths of an inch. Accordingly, the tape is tipped a small angle G about each support 26 and 28. This may be called an angle of approach, or an angle of exit, as the case may be. A positive angle G is shown in FIGURE 1. For example: angle G may be about +.05 radian.

An important factor entering into the design of the grooves 24 to obtain a predetermined spacing $h^*$ between the body member 12 and the moving tape 14 is the velocity V of movement of the tape. The design of the grooves 24 and the velocity V of the tape are predetermined to give a particular spacing $h^*$. It will be appreciated that the arrangement disclosed prevents any tape wear due to rubbing contact between the body member 12 and the tape 14.

For the sake of explanation and practicality, it is necessary in FIG. 1 to refresent positions and contours with greatly exaggerated proportions. For example, C may be 3 or 4 thousandths of an inch, $h^*$ may be 15 millionths of an inch, and thickness B of the body member may be any amount such as ½″.

Figure 2:
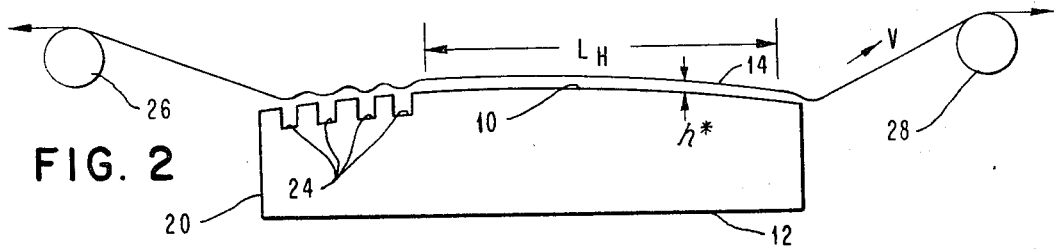
FIG. 2 is a side view of the body member and tape showing a large radius curvature type head.
Figure 3:
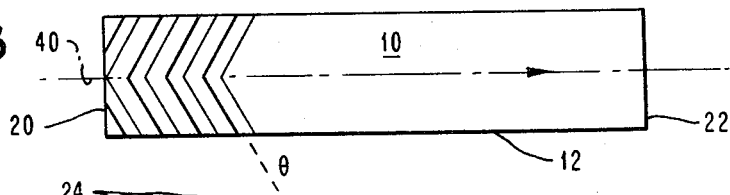
FIG. 3 is a top view taken along the line AA of FIG. 1 showing the angular relationship of the grooves with respect to the body member.
Figure 4:
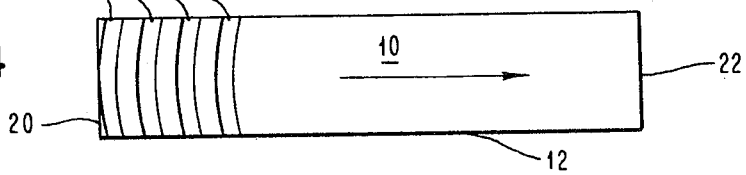
FIG. 4 is a top view of another embodiment showing the grooves curved, convex toward the leading edge of the body member.

Referring to FIG. 2, there is shown another embodiment of the invention in which the surface 10 of the body member 12 is shown as having a large radius of curvature. Thus, the invention is not limited to use with flat heads put will also provide predetermined spacing between a selected area of a curved surface having a large radius.

The operation of the embodiments of FIGURES 1 and 2 can be better understood with the use of the following expression:

$$k = \frac{T}{P - P_1}$$

$k$ is the radius of curvature on the tape at any point fixed in relation to the opposite rigid bearing surface.

T is the tension on the tape.

$P_1$ is the ambient pressure on one side of the tape at the fixed point.

P is the pressure on the other side of the tape at the fixed point.

It is emphasized in using the above expression that $k$ is the radius of an incremental length of moving tape at a point fixed relative to the surface. Thus, the radius $k$ is applicable to a static flexure in the tape due to a differential pressure acting across it while the tape is under tension T. Radius $k$ varies as the differential pressure on the tape varies along its length.

An important characteristic observed from the above expression is that when pressure P on one side of the tape 14 equals the ambient pressure $P_1$ on the other side of the tape, the radius $k$ becomes infinite, i.e., the tape moves in a straight line whenever the pressures are equal on its opposite sides.

In FIG. 1, the top side of the tape 14 always has ambient pressure $P_1$ applied thereto, which is atmospheric pressure in this example. Initially, as the tape 14 moves from support 26 toward the leading edge 20 of the body member 12, pressure $P_1$ exists on both sides of the tape; and it there must move in a straight line. As the tape 14 is moving, its surface frictionally engages air molecules and tends to carry them along. The groove or grooves 24 closest to the leading edge 20 of the body member 12 can be seen, in FIGS. 3–6, to extend thru the leading edge as well as the sidewalls of the body member, thus causing an initial air removal from between the tape 14 and the leading edge 20 of the body member 12. This prevents a bulge in this area of the tape which is ordinarily caused by the friction of the moving tape 14 which pumps air between the surface 10 and the tape, thus causing a rise in the pressure P underneath the tape as it initially moves over the surface 10. FIG. 1 shows the differential pressure relationship ($P-P_1$) on the tape 14 as it moves past the surface. Shortly thereafter, the tape 14 draws closer to the selected area of the surface 10 of the body member 12 due to the pumping action or removal of some of the air between the tape 14 and the surface 10 by the successive grooves 24. In actual practice the grooves 24 cause a sawtooth pressure effect on the tape 14 because of the sudden removal of some of the air as it is exited by means of the grooves 24. It can now be appreciated, that the removal of the air by the pumping action of the grooves 24 causes a pressure differential across the upper and lower surfaces of the tape 14. This causes the tape 14 to move closer to the surface 10 of the body member 12 until the pressure $P_1$ and P become equal on the opposite sides of the tape. This equalization occurs when the tape has moved only 10 to 20 thousandths of an inch from the last groove 24. Thereafter, for a distance $L_H$ along the surface 10 of the body member 12, the tape 14 maintains the constant air film spacing $h^*$ from the surface 10. Thus, the tape 14 will follow the contour of the surface subsequent to the grooves 24 at the same spacing therefrom at which the pressure across the tape is balanced. Just as the tape 14 is about to leave the surface 10 of the body member 12 at the trailing edge 22 thereof, an end effect pressure disturbance across the tape is created, which slightly disturbs the spacing $h^*$ at 10 to 20 thousandths of an inch from the end. Very shortly after leaving the end of the member, the pressure on opposite sides of the tape 14 again become equal at ambient $P_1$. Hence, the tape 14 moves in a straight line up to the pivot 28.

In this manner, the tape 14 has moved with a constant and stable spacing $h^*$ for a distance $L_H$, that can be made as long as desired by merely extending the surface 10 of the body member 12.

As previously mentioned, the tape velocity V, the tension thereof, the groove depth, width, and number as well as the width of the surface area between the grooves and the velocity of the tape each have an effect upon the air film thickness $h^*$. Another very important parameter which has an effect upon the air film thickness $h^*$, is the angular relationship of the grooves 24 with respect to the direction of movement of the tape 14. As can be seen from FIG. 3, the four grooves 24 shown therein, each have their apex facing toward the leading edge 20 of the body member 12 and accordingly in the opposite direction of the tape travel. It has been found in actual practice that such an angular relationship is necessary for the pumping operation to take place. The actual angle that the grooves 24 make with the body member 12 is defined by the angle $\theta$. The pumping operation has been produced utilizing $\theta$ of less than 90°. It has been noted that if the angular relationship with respect to the moving tape 14 is reversed, the opposite effect is produced. That is, the tape 14 is displaced from the surface 10 by a pumping action which pumps air into the area between the moving tape 14 and the selected area of the surface 10. A further possible configuration of the grooves 24, is shown in connection with FIG. 4. Here the grooves 24 are shown as curves concave toward the leading edge 20 of the body member 12. Thus they extend angularly in the direction of tape travel in addition to extending from the centerline of the body member to the sidewalls thereof.

Figure 5:
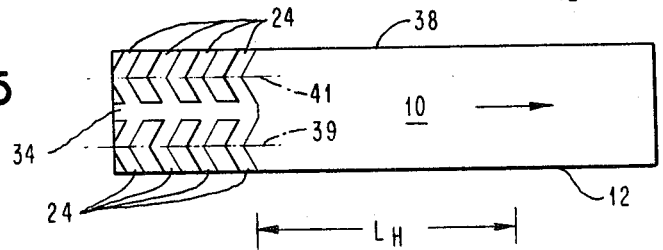
FIG. 5 is a top view showing another embodiment of the invention.

The groove arrangement depicted in FIG. 5 brings out another very important principle with respect to the present invention. It will be noted that the grooves 24 do not extend all the way through the body member 12 from side to side but there is a slot 34 cut longitudinally into the body member 12 which serves as an air passage for the inner ends of the grooves 24. Thus, each section 36 and 38 of the body member 12 adjacent the longitudinal slot 34 might be considered as serving as a separate body member of its own with the grooves 24 extending all the way through from side to side as was the case in connection with FIG. 1. Thus, the same operation can take place in each section 36 and 38 as takes place in FIG. 1. It should be noted in connection with the various groove arrangements that the grooves 24 in each section 36 and 38 are symmetrical about a center line 39, 41, respectively. Thus, in FIG. 5 the grooves 24 are symmetrical about a longitudinal centerline 36 running down the middle of the body member section 36 and connecting the apexes of the grooves 24. Likewise, the grooves 24 in the end portion are symmetrical about a centerline 41, that connects the apexes of the triangles formed by the grooves 24. Thus, the requirement of symmetry of the grooves is complied with.

In actual practice the principle of this invention can be demonstrated by using only one groove 24. However, usually ten or more grooves 24 are utilized to obtain the desired spacing with the velocity of tape travel usually utilized in modern tape reading and writing apparatus.

Figure 6:
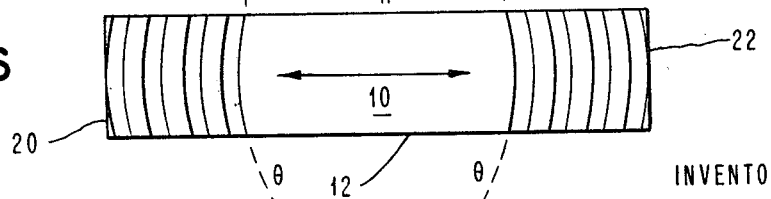
FIG. 6 is a top view of another embodiment of the invention showing the grooves at both ends of the body member.

FIGURE 6 shows an embodiment wherein the grooves 24 are located at the leading edge 20 and the lagging edge 22 of the body member 12 with the selected area $L_H$ therebetween. The grooves 24 at opposite ends of the body member 12 also have opposite predetermined angular relationships with respect to the body member 12 as well as the moving tape 14. It can be seen that the grooves 24 are concave toward the leading edge 20 at the one end thereof and are concave towards the lagging edge 22 at the other end thereof. Thus as the tape 14 passes the leading edge 20, the pumping action caused by the grooves 24 takes place and the tape 14 is spaced over the selected area $L_H$ with the predetermined desired spacing $h^*$. As the tape 14 moves over the grooves 24 at the lagging edge 22 of the body member 12, the opposite effect is produced. That is, the pumping action is reversed because of the reverse angular relationship of the grooves 24 with respect to the tape 14 and the tape 14 is moved away from the body member 12. It will be appreciated that the direction of movement of the tape 14 can be reversed with respect to the embodiment depicted in FIG. 6 and still obtain the desired spacing $h^*$.

Figure 7:
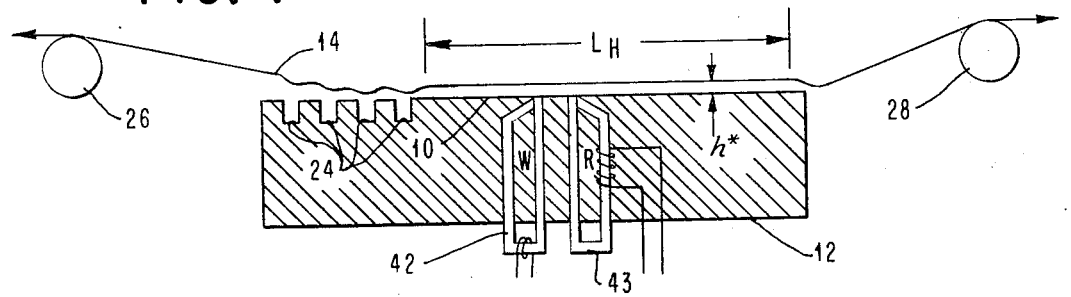
FIG. 7 is a vertical cross-sectional view of the body member containing grooves and showing a read and write head located in the preselected area.

In FIG. 7 a pair of head gaps 42 and 43 are provided for a single tape track; wherein one gap might be a write head gap 42 and another gap might be a read head gap 43. The grooves 24 precede the head gaps 42 and 43 and the gaps are located in the selected area long the length $L_H$.

Also, as described above, the portion of the tape 14 over the gaps is spaced $h^*$ from the body member 12.

Figure 8B:
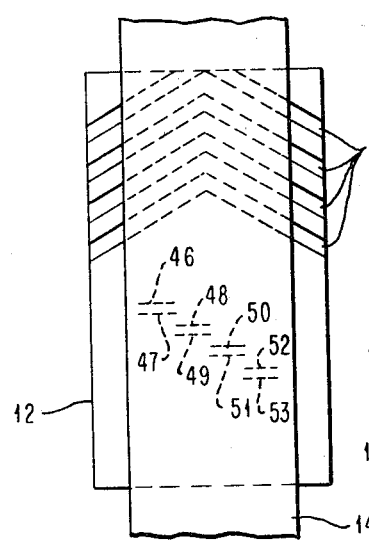
Figure 8C:
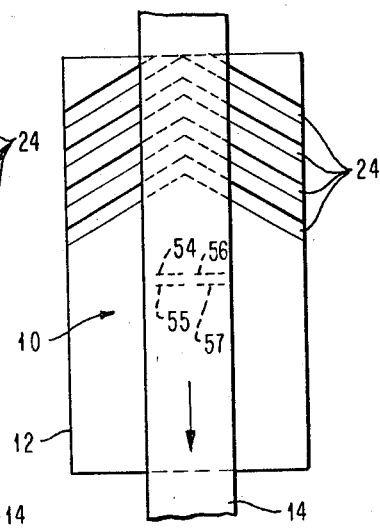

FIGURES 8A thru C illustrate different lengths (transverse to the tape) for grooves 24 in different situations where the air bearing is being used to lubricate a moving magnetic tape 14 being read or written by head gaps at different locations on the surface 10.

In FIG. 8A, a pair of head gaps 44 and 45 are provided for a single tape track; wherein one gap might be a write head gap and the other gap might be a read head gap. In this case, the three grooves 24 precede the head gaps 44 and 45 and have an overall groove length which is shorter than the width of the tape 14 travelling thereover. In other words, the body member 12 and the surface 10 thereof are narrow in comparison to the width of the tape 14 being used. On the other hand, FIG. 8B shows an arrangement in which the body member 12 and the grooves 24 located therein are considerably wider than the tape 14 width. This figure also shows that the head gaps are staggered among plural tape tracks. Thus, the gaps 46 and 47 apply to one track, 48 and 49 apply to a second track, 50 and 51 apply to a third track, and 52 and 53 to a fourth track. It will be appreciated that providing a grooved arrangement wider than the tape itself, will insure that the entire tape width is spaced at the desired spacing $h^*$ from the surface 10 of the body member 12 wherein the head gaps are located.

FIGURE 8C again shows the grooves 24 having a length substantially greater than the width of the tape 14. In this example, the head gaps 54, 55 and 56, 57 are located with a side by side arrangement. It can be seen, that the surface 10 is designed to operate with different widths of the tape 14. Hence, it can obtain the constant spacing $h^*$ for any width of tape 14 less than the length of the grooves.

The embodiments described thus far show a tape 14 or web having the configurations of an elongated web or strip of flexible material. Other configurations can also be used. FIGURES 9 and 10 show an embodiment involving a rotating flexible web represented by a rotating flexible disk 60 which is centrally connected to a motor 61, to which is also connected a plate 64 having a plurality of perforations there thru over its entire surface. The rotating plate 64 stabilizes generally the position of the disk 60. In this particular case, a head 66 has its gap mounted flush with the surface behind the grooves 24, as previously described. The head 66 is mechanically supported in a rigid body member 12 by a servo arm 68 of the conventional type used with disks and the arm 68 is connected to body member 12 by means of a support 70. The servo arm 68 may be of the type commonly used on commercial disk files such as the I.B.M. 1405 or 1311 disk file. In operation, a slight bulge occurs in the surface of the disk 60 adjacent to the body member surface 10 to obtain a spacing $h^*$ between a portion of the disk surface and the body member surface 10. Of course, the air lubricated film spacing $h^*$ for the head will vary somewhat with the utilized radius of the disk 60 as the velocity changes as a function of the radius of the disk being used by the head gap 66. Often $h^*$ under this condition varies by perhaps a two-to-one factor which is generally tolerable.

In those cases where reading and writing is done with one direction of movement of the tape 14, rewind is accomplished by merely reversing the tape direction. It is an inherent property of the grooved arrangement for obtaining the $h^*$ spacing of the tape 14 with respect to the selected area $L_H$ of the surface 10 of the body member 12 that an opposite pumping action is obtained when the tape 14 is reversed. Thus, the tape 14 in rewind instead of being spaced closer to the selected area $L_H$ of the surface 10 will be forced further therefrom and it will take the position shown by the dashed line 30 in FIG. 1. Where some type of read head sensing is needed in the reverse tape direction, it can be done by recording marker signals on the tape at a low density to be sensed by the head while it is spaced from the tape by the substantial distance C.

This invention is also operable and hereby includes the situation in which the surface 10 of the body member 12 is any continuous and smooth surface, that is, uniform changes in surface contour are permissible without breaks in contour. A break in contour of surface 10 adversely affects operation.

While the invention has been particularly shown and described with reference to preferred embodiments thereof, it will be understood by those skilled in the art that various changes in form and detail may be made therein without departing from the spirit and scope of the invention.

What is claimed is:

1. Apparatus for controlling the spacing between the surface of a body and a material having relative movement along said surface, comprising
   a selected area of said surface over which the spacing of said material from the body is controlled,
   a plurality of grooves located on said surface in said body before said selected area on the side approached by said material,
   said grooves being symmetrical about a centerline of said surface extending in the direction of material travel,
   said grooves extending angularly in the direction of travel of said material over said surface from said centerline across said surface and thru the respective sidewalls of the body member to provide a substantially unobstructed air path,
   and drive means for providing movement of said material centered on and parallel to said centerline of the surface of said body member.

2. Apparatus according to claim 1, wherein each of said grooves symmetrical about said center line of said surface extending in the direction of material travel are broken by a slot symmetrical about said centerline, thereby forming two separate surfaces having grooves extending angularly thereacross symmetrically about a respective centerline extending in the direction of travel of said material.

3. Apparatus according to claim 1, wherein said grooves are of a depth determined in accordance with the velocity of relative motion between said material and said surface, the tension applied to said material and the number of said grooves.

4. Apparatus according to claim 1, wherein said grooves on each side of said centerline are straight and form an angle at the centerline of said surface in which the apex of the angle points in the opposite direction of travel of said material relative to said surface.

5. Apparatus according to claim 1, wherein said grooves are curved with a large radius of curvature, the center point of said curve being located on said centerline.

6. Apparatus according to claim 1, wherein said grooves and relative movement of said material with respect to said grooves provides a pressure differential across said material in the area between said grooves and said selected area causing said material to draw closer to said track until said pressure differential is nullified over said selected area.

7. Apparatus according to claim 1, wherein similar grooves are located on said surface in the area adjacent to the other end of said body member following said selected area, said similar grooves extending angularly from said centerline across said surface and thru the respective sidewalls of the body member in the opposite direction of said grooves located on the surface before said selected area, so that the relative motion of the material and surface can be in either direction to obtain the predetermined spacing over the preselected area of the surface.

8. Apparatus according to claim 1, wherein each of said grooves is separated from the adjacent groove therein by an area on said surface which is of a fixed width and which is smooth and continuous.

9. Apparatus according to claim 1, wherein first and second material supports are provided located oppositely with respect to said selected area, said material supports being capable of supporting said material in a straight line away from said surface by a distance greater than a controlled spacing of said material from said surface.

10. Apparatus according to claim 1, wherein at least one gap for a magnetic head is formed flush with said surface and is located anywhere within said selected area.

References Cited

UNITED STATES PATENTS

| | | | |
|---|---|---|---|
| 2,837,330 | 6/1958 | Lawrence et al. | 226—49 X |
| 2,866,637 | 12/1958 | Pendleton | 226—49 X |
| 3,151,796 | 10/1964 | Lipschutz | 226—97 |
| 3,273,896 | 9/1966 | Maeder | 274—11 |
| 3,327,916 | 6/1967 | Weidenhammer et al. | 226—97 |

M. HENSON WOOD, JR., *Primary Examiner.*

J. P. MULLINS, *Assistant Examiner.*